Nov. 20, 1945.    M. M. MARISIC    2,389,378
CATALYTIC CONVERSION SYSTEM
Filed June 14, 1944
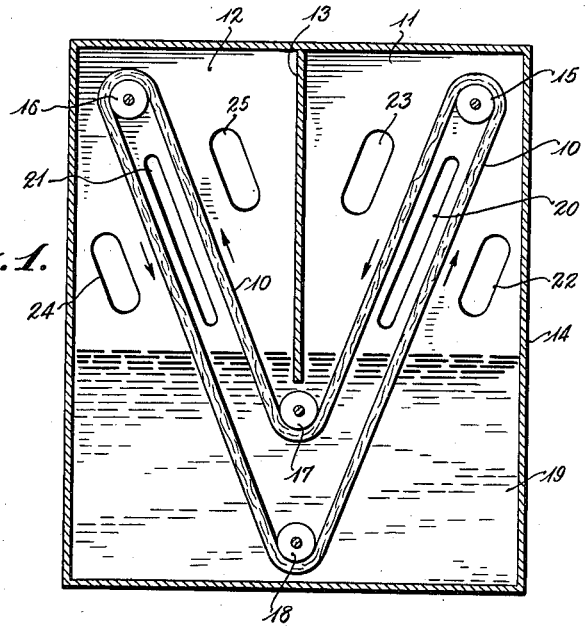
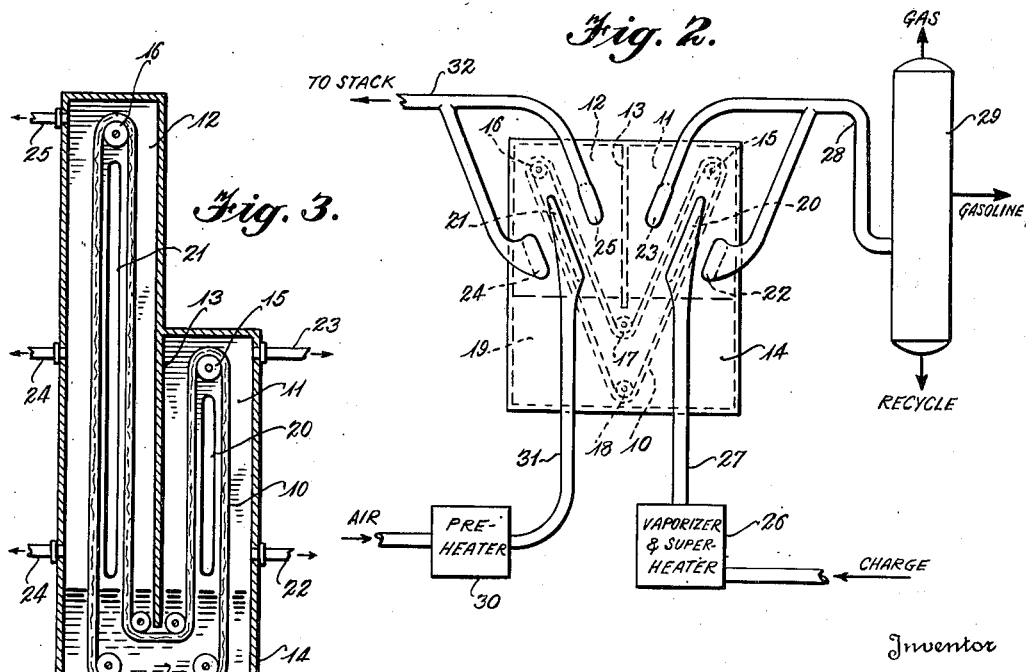
Inventor
Milton M. Marisic
By Oswald G. Hayes
Attorney Patented Nov. 20, 1945

2,389,378

UNITED STATES PATENT OFFICE 2,389,378

CATALYTIC CONVERSION SYSTEM

Milton M. Marisic, Woodbury, N. J., assignor to Socony-Vacuum Oil Company, Incorporated, a corporation of New York Application June 14, 1944, Serial No. 540,293

6 Claims. (Cl. 196—52)

This invention relates to a method and apparatus for conducting catalytic conversion of fluid materials in the presence of porous filaments of inorganic oxides having adsorptive and catalytic properties.

The invention is essentially a method and corresponding apparatus for effecting contact between fluids and solids of adsorptive porous nature. Many such operations are known and the invention is not primarily concerned with the nature of the reactions conducted or the composition of the fluids and solids brought into contact. Rather, the invention relates principally to the manner of effecting contact, particularly in operations where the porous adsorptive solid is alternately contacted with two fluids of different nature and mingling of such fluids is undesirable. A typical example of processes to which the invention is peculiarly well adapted is continuous catalytic cracking of heavy petroleum fractions to give high yields of gasoline having good anti-knock properties. During the cracking conversion, a carbonaceous deposit is laid down on the catalyst which reduces the efficiency thereof rapidly until satisfactory cracking is no longer feasible. The catalyst is then contacted with an oxidizing gas at proper temperature to burn off the "coke" and thereby regenerate the cracking activity of the catalyst which is then returned to contact with hydrocarbons for repetition of the cracking reaction.

According to the present invention, the porous solid is provided in the form of filaments of porous inorganic oxides fabricated into a flexible sheet or bundle as by weaving, knitting, braiding, twisting, etc. The bundle of filaments is passed alternately through separated chambers wherein the two contacting operations are performed and purging of fluid from the bundle is effected upon withdrawal from each chamber. To accomplish this successive passing through the two chambers, the bundle or sheet of filamentous inorganic oxides is formed into an endless belt or rope.

The filaments of inorganic oxides are advantageously prepared by any one of several methods. Two very satisfactory methods affording good control over porosity and composition of the filaments are extrusion of colloidal solutions into coagulating baths capable of forming true hydrogels of the sols and leaching of treated silicate glasses.

Filaments are formed of true hydrogels by forming colloidal solutions which can be coagulated to firm hydrogels without forming the structurally weak gelatinous precipitates which are often referred to erroneously as "gels." A very satisfactory process of this type is described in the copending application of Milton M. Marisic and Edward M. Griest, Serial Number 529,822, filed April 6, 1944. According to the process of that application, a gelable sol is formed and aged to the stage where the viscosity has increased to a considerable extent, but the colloid still has the flow characteristics of a liquid, i. e., a gel of firm structure has not been formed. The viscous liquid so prepared, which is known as a "jelly" is injected into ammonia, either gaseous or as an aqueous solution. This causes immediate coagulation to a firm hydrogel.

In forming hyrogel filaments by this process, an acid solution was prepared by mixing 2.60 liters of 38% hydrochloric acid (1.19 specific gravity) with 4 liters of a solution containing 885 grams of $Al_2(SO_4)_3 \cdot 18H_2O$ and making the total volume of the solution equal to 10.25 liters. A second solution was prepared by diluting 18.7 pounds of "N" brand sodium silicate (28.7% $SiO_2$, 8.9% $Na_2O$) with water to form 17 liters of solution. These two solutions were mixed by adding the latter solution to the former while agitating the acid solution efficiently with a mechanical stirrer. The resultant colloidal solution had a pH of 0.3.

A portion of the hydrosol was neutralized to a pH of 2.5 to form a jelly by careful addition of aqueous ammonia while efficiently mixing the sol. This jelly was extruded through a spinneret of the type used in spinning rayon but having holes of considerably larger size, about $1/100$ inch, into a bath of aqueous ammonia. The jelly coagulated immediately to filaments of hydrogel which were partially dried to a water content of 25 to 40% in order to increase their strength for further processing. The partially dried filaments were collected as a loose skein and were washed with water and soaked in a 15% solution of

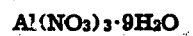
$Al(NO_3)_3 \cdot 9H_2O$

The filaments were then dried and woven into a belt in which form they were heated to 1100° F. and tested as a cracking catalyst by passing Oklahoma City gas oil in contact with the catalyst at 800° F. and a liquid space velocity of 1.5 for twenty minutes. A yield of 52% of 400° F. endpoint gasoline was obtained.

Alternatively, the hydrosol may be heated at 75° C. for two hours or aged at room temperature for 12 hours to form the jelly which is extruded into the ammonia bath.

The catalytic filaments may also be prepared from glass. A suitable glass is made up, spun into filaments in any suitable manner and then treated to render it porous. A very satisfactory porous glass may be prepared from a boro-silicate glass or the like, by heating the glass for a period of time sufficient to cause the glass to separate into two phases; one rich in silica and one poor in silica. The glass is then leached with acid to dissolve out the phase poor in silica, leaving a porous body consisting principally of silica.

In a typical example, a glass having the composition of 75% $SiO_2$, 5% $Na_2O$ and 20% $B_2O_3$ was prepared and the molten glass was spun to provide glass fibers. The fibers were heat treated at 1050° F. overnight, cooled and extracted with 3.5 normal nitric acid until substantially all of the acid soluble phase of the glass was dissolved. Because of the very small diameter of the glass fibers, this extraction takes little time, usually not over five minutes. The fibers were then washed with water until free of soluble matter and then soaked overnight in a 15% solution of $Al(NO_3)_3 \cdot 8H_2O$. The salt solution was poured off and the fibers were dried at 180° F. and gradually heated to 1100° F. at which temperature they were maintained for four hours. During the heating step, the aluminum nitrate was converted to alumina, giving a catalyst containing 87.7% $SiO_2$, 7.4% $Al_2O_3$, 4.6% $B_2O_3$ and 0.3% $Na_2O$. When tested under the conditions outlined above, this catalyst gave a yield of 30% of 410° F. endpoint gasoline.

Catalytic fibers prepared according to the above examples, or in any other suitable manner, are fabricated into sheets, ropes or the like by conventional means and the fabricated bodies are formed, either at the time of fabrication or afterward, into endless belts. The belts are then mounted to pass continuously in a cyclic path including two chambers and means are interposed in said path between the chambers for purging from the fabricated catalyst, fluids retained by the catalyst, as by occlusion, adsorption, etc. Suitable apparatus for such a process is shown in the annexed drawing, wherein:

Figure 1 is a vertical section through a compartmented chamber for practicing the invention;

Figure 2 is a flow sheet illustrating a plant unit for the process; and

Figure 3 is a view similar to that of Figure 1 showing a modified embodiment.

As shown in Figure 1, an endless belt 10 formed of catalyst fibers is passed through chambers 11 and 12 provided by a partition 13 in a vessel 14. Rollers 15 and 16 in the upper portions of the chambers and rollers 17 and 18 below the partition carry the catalyst belt and provide positive drive therefor. The lower end of the partition dips into a pool 19 of a liquid which is inert to the catalyst and the gases in the two chambers and which is a stable liquid at the conditions of temperature and pressure prevailing in the vessel 14. A molten metal, lead for example, is very well suited for the purpose.

Within each of the loops formed by the upper and lower runs of the catalyst belt is an inlet 20, 21 to admit gaseous reactant to the chambers for contact with the catalyst. Outlets 22 and 23 are provided to withdraw from chamber 11, gaseous products of contact with catalyst belt 10 and outlets 24 and 25 serve a similar purpose in chamber 12.

This design provides great flexibility in operating conditions. It is self adjusting for variations in differences in pressure between the two chambers 11 and 12, the liquid level on each side of the partition 13 rising and falling with pressure differential variations. If it is desired to operate one chamber at considerably higher pressure than the other, the unit is easily redesigned to provide for a compensating hydraulic head. Differences of contact time are also readily provided. The rollers 15 and 16 may be shifted up or down to give relatively longer runs in either chamber or one chamber may be operated at a greater pressure than the other to provide a difference in liquid level which effectively changes the relative lengths of the catalyst runs in the two chambers. The modification of Figure 3 is well suited to such use.

The diagrammatic showing in Figure 2 is illustrative of use of the apparatus for cracking of hydrocarbon oils. A catalyst belt formed of dried silica-alumina hydrogel fibers prepared as described above is fitted about the rollers 15, 16, 17 and 18 passing through a lead bath maintained at 850° to 900° F. A gas oil charge is vaporized and the vapors superheated to about 800° F. in heater 26 and the superheated vapors are conducted to inlet 20 by line 27. Preferably the inlet 20 is in the form of a perforated manifold to distribute the vapors uniformly across chamber 11 to pass through the catalyst belt 10 at a rate of about one volume of liquid oil per volume of catalyst per hour. The vapors of cracked hydrocarbons issuing from catalyst 10 are withdrawn by outlets 22 and 23, which are also preferably in the form of perforated manifolds, and passed by line 28 to fractionator 29 where the cracked products are separated into suitable fractions.

The catalyst belt, after traversing chamber 11 passes to chamber 12 through the lead bath 19. The molten lead enters the spaces among the fibers of the catalyst and thus purges it of gaseous and liquid hydrocarbons occluded in the fabric without entering the pores of the catalyst fibers. From leaving the bath and entering chambers 12, the catalyst contacts an oxidizing gas supplied from preheater 30 through line 31 to inlet 21. The oxidizing gas, usually air, after passing through the catalyst bed is withdrawn at outlets 24 and 25 and passed by line 32 to a stack, preferably passing through heat economizers en route. Preferably, the inlets and outlets in chamber 12 are also in the nature of manifolds to induce adequate contact across the chamber. Following regeneration, the catalyst belt is again purged by passing through the lead bath and returned to cracking chamber 11.

It will be apparent that other purging means may be employed without departing from the spirit of the invention. For example, the catalyst belt may be passed through a plurality of zones with steam blanketing and purge zones interposed between cracking and regeneration zones.

I claim:

1. The process of converting hydrocarbons which comprises passing an endless belt of adsorbent porous fibers of silica-alumina hydrogel in a continuous path including a reaction zone, a regeneration zone and at least one purge zone wherein the belt is immersed in a bath of molten lead, passing hydrocarbon vapors at conversion conditions of temperature and pressure in contact with said fibers in said reaction zone, purging hydrocarbon vapors from said fibers in said purge zone, contacting oxidizing gas with said fibers in said regeneration zone and returning regenerated fibers to said reaction zone.

2. The process of converting hydrocarbons which comprises passing an endless belt of adsorbent porous fibers of porous silica impregnated with alumina, prepared by acid leaching a heat treated boro-silicate glass and impregnating the leached glass with alumina, in a continuous path including a reaction zone, a regeneration zone and at least one purge zone wherein the belt is immersed in a bath of molten lead, passing hydrocarbon vapors at conversion conditions of temperature and pressure in contact with said fibers in said reaction zone, purging hydrocarbon vapors from said fibers in said purge zone, contacting oxiding gas with said fibers in said regeneration zone and returning regenerated fibers to said reaction zone.

3. The process of converting hydrocarbons which comprises passing an endless belt of adsorbent porous fibers of silica and alumina having catalytic properties for the desired conversion in a continuous path including a reaction zone, a regeneration zone and at least one purge zone wherein the belt is immersed in a bath of molten lead, passing hydrocarbon vapors at conversion conditions of temperature and pressure in contact with said fibers in said reaction zone, purging hydrocarbon vapors from said fibers in said purge zone, contacting oxidizing gas with said fibers in said regeneration zone and returning regenerated fibers to said reaction zone.

4. The process of converting hydrocarbons which comprises passing an endless belt of adsorbent porous fibers of silica-alumina hydrogel in a continuous path including a reaction zone, a regeneration zone and at least one purge zone, passing hydrocarbon vapors at conversion conditions of temperature and pressure in contact with said fibers in said reaction zone, purging hydrocarbon vapors from said fibers in said purge zone, contacting oxidizing gas with said fibers in said regeneration zone and returning regenerated fibers to said reaction zone.

5. The process of converting hydrocarbons which comprises passing an endless belt of adsorbent porous fibers of porous silica impregnated with alumina, prepared by acid leaching a heat treated boro-silicate glass and impregnating the leached glass with alumina, in a continuous path including a reaction zone, a regeneration zone and at least one purge zone, passing hydrocarbon vapors at conversion conditions of temperature and pressure in contact with said fibers in said reaction zone, purging hydrocarbon vapors from said fibers in said purge zone, contacting oxidizing gas with said fibers in said regeneration zone and returning regenerated fibers to said reaction zone.

6. The process of converting hydrocarbons which comprises passing an endless belt of adsorbent porous fibers of silica and alumina having catalytic properties for the desired conversion in a continuous path including a reaction zone, a regeneration zone and at least one purge zone, passing hydrocarbon vapors at conversion conditions of temperature and pressure in contact with said fibers in said reaction zone, purging hydrocarbon vapors from said fibers in said purge zone, contacting oxidizing gas with said fibers in said regeneration zone and returning regenerated fibers to said reaction zone.

MILTON M. MARISIC.